July 18, 1944.       R. B. McKINNIS       2,353,841
APPARATUS FOR EXTRACTING FRUIT
Filed Sept. 12, 1940       5 Sheets-Sheet 1
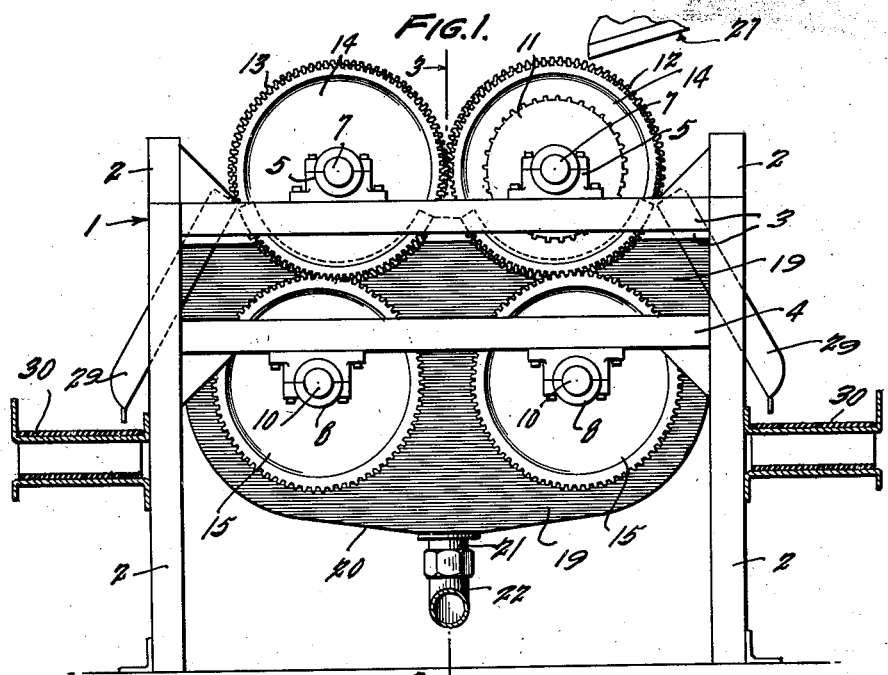
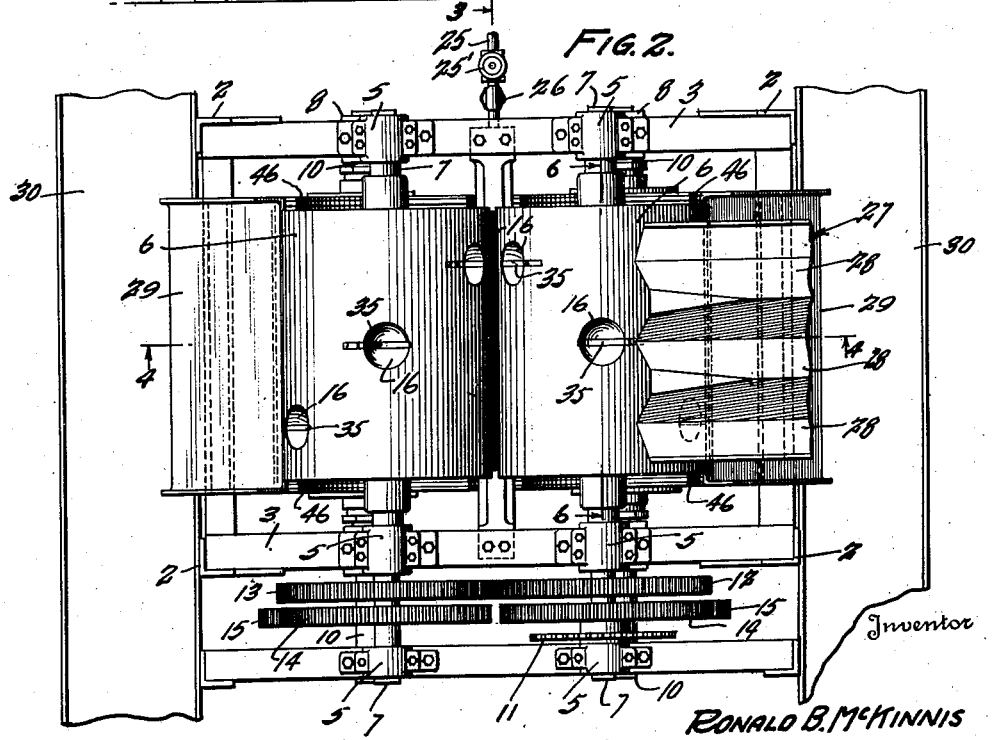
Inventor
RONALD B. McKINNIS
By Semmes, Keegin & Semmes
Attorneys July 18, 1944. R. B. McKINNIS 2,353,841
APPARATUS FOR EXTRACTING FRUIT
Filed Sept. 12, 1940 5 Sheets-Sheet 2

Inventor
RONALD B. McKINNIS

By Semmes, Keegin & Semmes
Attorneys

July 18, 1944.   R. B. McKINNIS   2,353,841
APPARATUS FOR EXTRACTING FRUIT
Filed Sept. 12, 1940   5 Sheets-Sheet 3

Inventor
RONALD B. McKINNIS
By Semmes, Keegin & Semmes
Attorneys

July 18, 1944.  R. B. McKINNIS  2,353,841
APPARATUS FOR EXTRACTING FRUIT
Filed Sept. 12, 1940  5 Sheets-Sheet 4
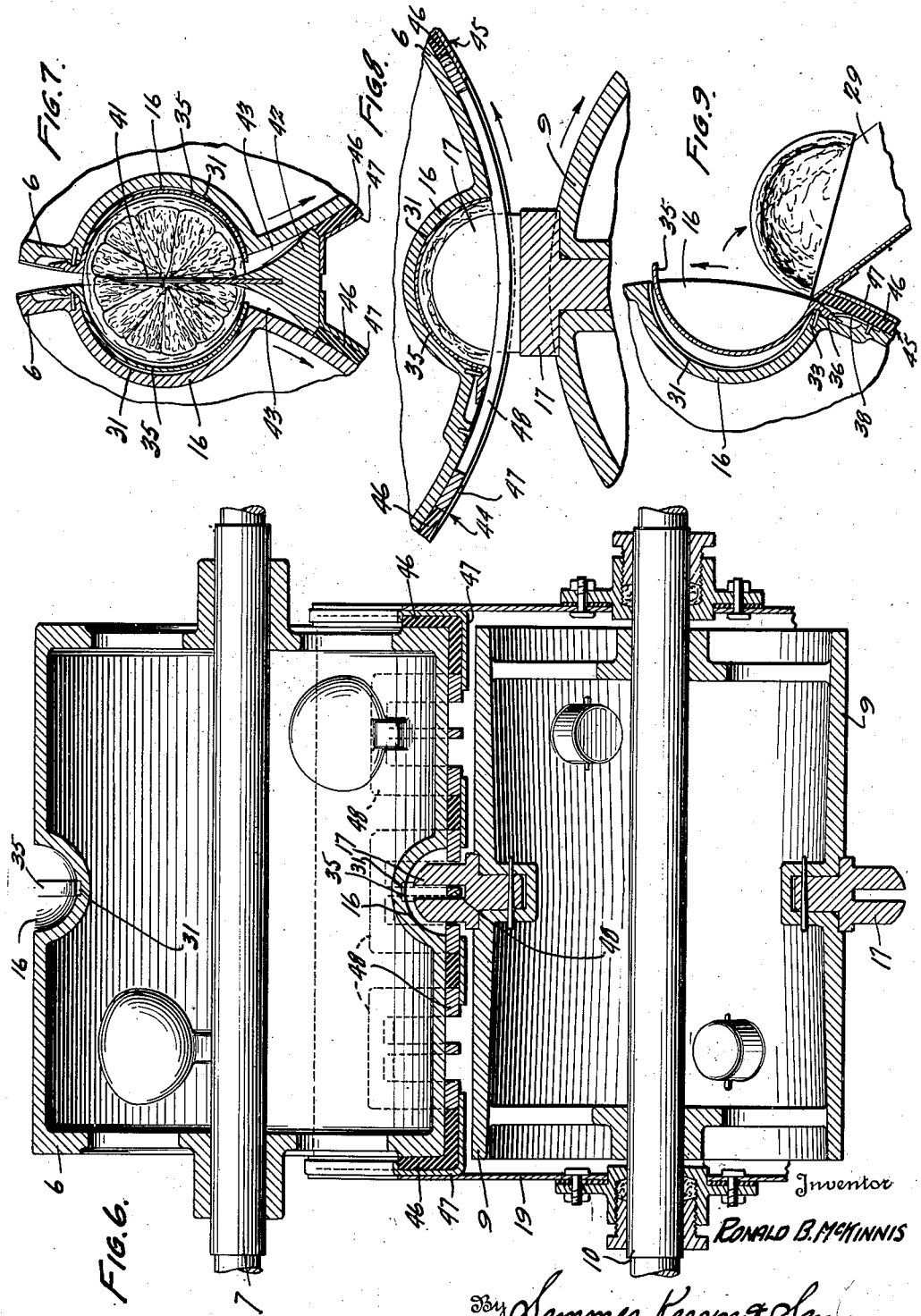

Patented July 18, 1944

2,353,841

UNITED STATES PATENT OFFICE 2,353,841

APPARATUS FOR EXTRACTING FRUIT

Ronald B. McKinnis, Winter Haven, Fla., assignor, by mesne assignments, to Ronald B. McKinnis, doing business as McKinnis Foods, Winter Haven, Fla.

Application September 12, 1940, Serial No. 356,546

6 Claims. (Cl. 99—272)

My invention relates to an extracting apparatus and in particular to apparatus for use in extracting juice from citrus fruit.

It is an object of the invention to extract juice from fruit and vegetables, and in particular citrus fruit, without permitting access of the oxygen of the air to the juice extracted.

A further object of the invention is to provide a method and mechanism which will permit the peel oil from the surface of the skin of the fruit when it is initially cut to be ejected from the system, so that the amount of peel oil obtained in the extracted juice which flows from the extracting chamber is minimized.

Yet another object of the invention is to provide a simple and effective ejecting means for ridding the extracting mechanism of the hulls of the extracted fruit or vegetables.

A still further object of the invention is to provide a novel type of seal which comprises a flexible gasket arrangement which permits of simplification in both process and apparatus where the fruit or vegetable is extracted in an inert atmosphere.

With these and other objects in view, I have illustrated one form of my process and one embodiment of my apparatus, though it is to be understood that changes may be made therein by those skilled in the art without departing from the scope of the appended claims.

Referring to the drawings:

Figure 1 is a view in side elevation, and partly in section, showing my extracting mechanism;

Fig. 2 is a top plan view of the mechanism illustrated in Figure 1;

Fig. 6 is a sectional view taken through the axis of rotation of one pair of the extractor rollers;

Fig. 7 is a detail sectional view showing how the fruit is cut;

Fig. 8 is a detail sectional view showing how the juice is extracted;

Fig. 9 is a detail sectional view showing how the peel is ejected from the holding pockets;

Figure 3:
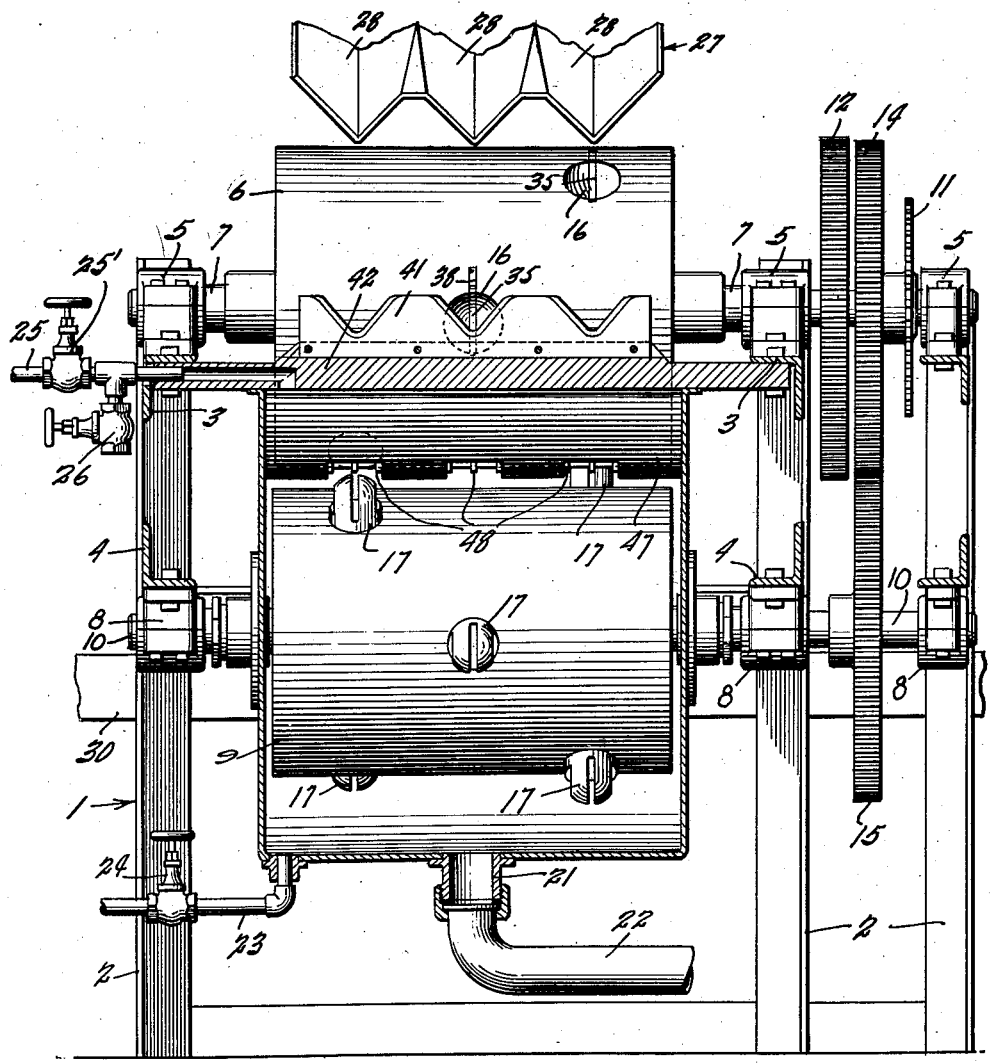
Fig. 3 is a view taken along the line 3—3 of Figure 1, looking in the direction of the arrows.
Figure 4:
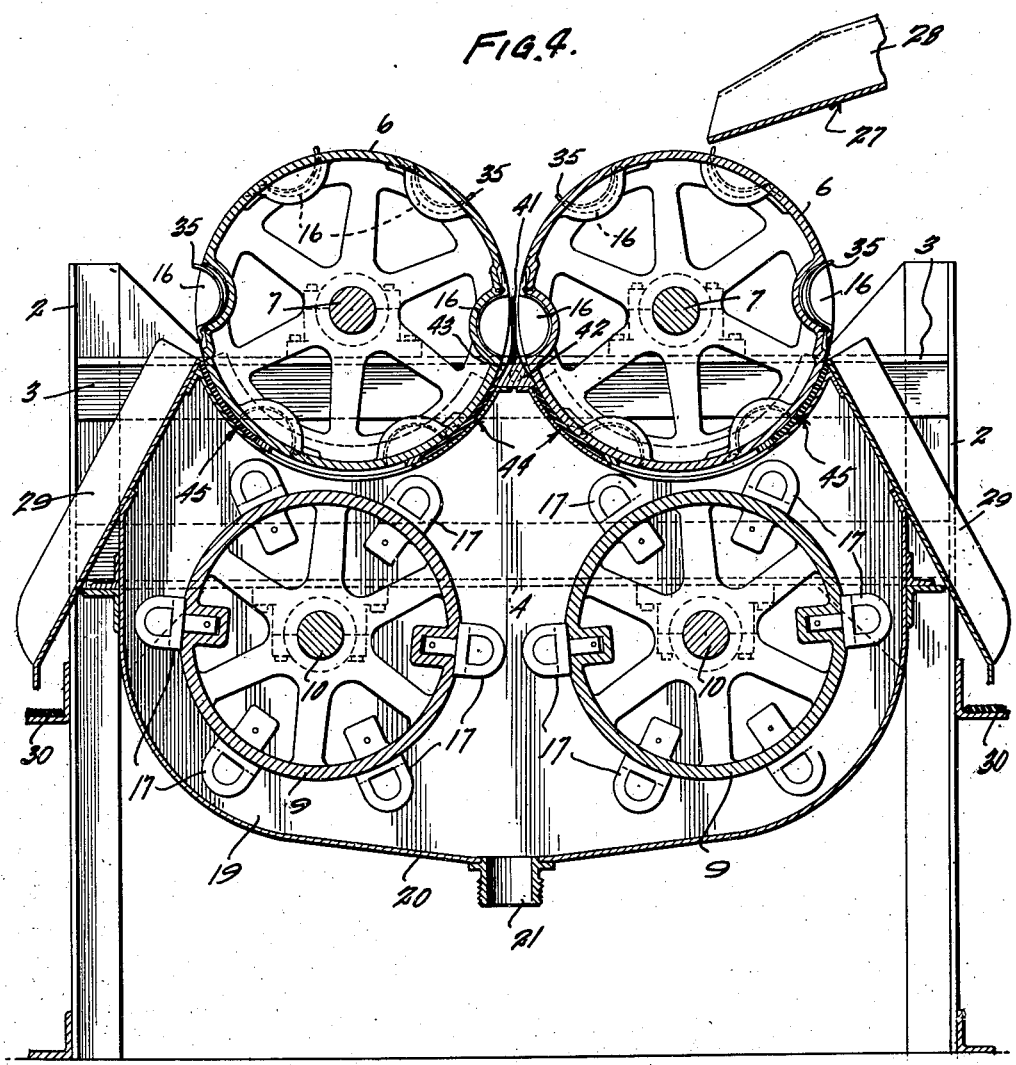
Fig. 4 is a view taken along the line 4—4 of Figure 2, looking in the direction of the arrows.

Referring to the drawings, I have shown a framework 1 comprising uprights 2, upper crossbars 3 and lower crossbars 4. On the upper crossbars 3 are adapted to be journaled at 5 upper extractor rollers 6 mounted on shafts 7. Journaled at 8 are lower extractor rollers 9 mounted on shafts 10.

One of the upper shafts 7 and the upper extractor rollers 6 carries a sprocket wheel 11 which is adapted to be driven by a chain drive from a suitable source of power, not shown. The shaft 7 which carries the sprocket wheel 11 also carries a gear 12 which meshes with a gear 13 mounted on the other shaft 7. Both shafts 7 therefore revolve together. Each shaft 7 also carries a gear 14 which meshes respectively with gears 15 carried by the shafts 10 of the lower extractor drums 9. The arrangement is such that by a chain drive operating through sprocket wheel 11 both the upper and lower pairs of extractor drums are adapted to rotate in unison. The upper extractor drums 6 are formed with a series of holding pockets 16 which are adapted to mesh with compressor heads 17 carried by the lower extractor drums 9 during rotation of the drums through the gear trains above described.

The upper part of each extractor drum 6 is adapted to revolve in the open air and the lower part is adapted to revolve out of contact with air and in communication with an extractor chamber 19 in which the lower extractor drums 9 are wholly housed. The extractor chamber 19 is provided with a downwardly sloping bottom, as indicated at 20, and a discharge outlet 21 through which the juice extracted is to be discharged. In practice there will be valves controlling the flow of juice, but these are not shown in the drawings for purposes of simplicity. The juice discharged through the aperture 21 flows through a juice line 22 to some point of storage, or to a can filling machine.

Adapted to fill the extractor chamber 19 with hot water is a hot water pipe 23 having a control valve 24. In practice the juice extracting chamber is completely filled with sterilizing hot water. The hot water is then withdrawn from the system, flowing out through juice line 22, and at the same time inert gas, such as carbon dioxide or nitrogen, or a mixture of the two, is allowed to flow into the system through the pipe 25 controlled by a valve 25'. In filling the system with hot water through the pipe 23, a vent 26 is opened in the line 25 to permit air in the system to escape as the hot water is introduced into the system.

By the method outline, the system is thoroughly sterilized and cleaned, and filled with inert sterile gas through the inert sterile gas line 26.

There is provided a feeding trough 27 which is adapted to feed oranges, grapefruit, other citrus fruit, and other types of fruit and vegetables to the holding pockets 16 which are located in the upper extractor drums 6. There are three rows of holding pockets shown in the upper extractor drums 6, and the trough 27 is shown provided with chutes 28 for each of the three rows of holding pockets provided in the upper extracting drums.

The hulls discharged from the holding pockets are adapted to fall into discharge chutes 29 located at either side of the machine which feed on to power driven endless belts 30 which discharge the hulls at a remote point.

Figure 5:
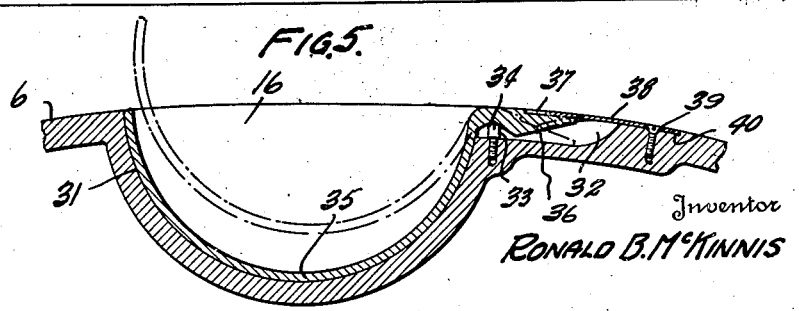
Fig. 5 is a detail sectional view showing the construction and operation of the ejector finger mechanism.
Figure 10:
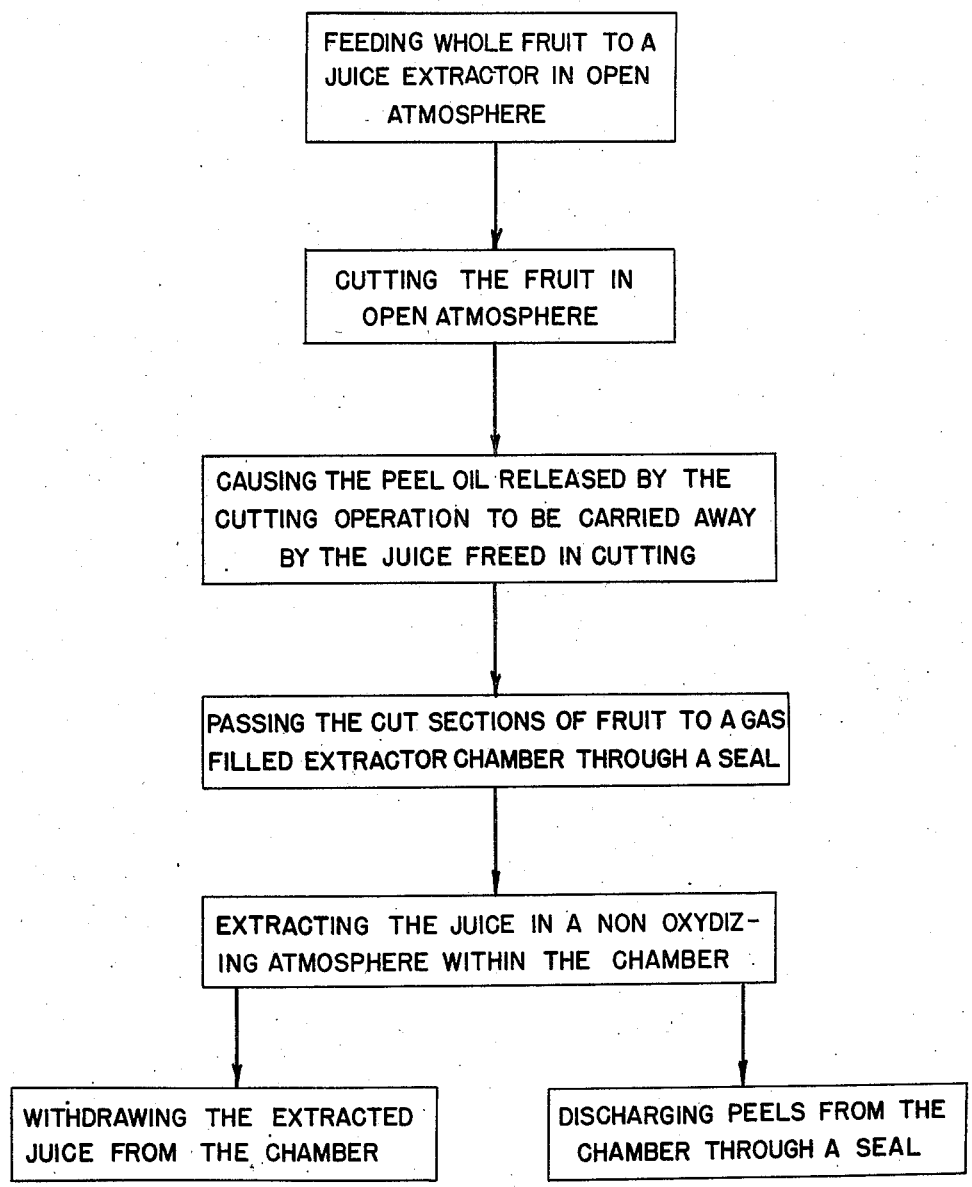
Fig. 10 is a flow sheet showing one form of my process.

Each holding pocket 16 is formed as is illustrated in the cross sectional view, Figure 5. There is a semi-circular indentation 31 formed in the drum 6, and such semi-circular indentation 31 has an offset indentation 32 at one side of its upper edge. Mounted in the indentation 32 is a fulcrum member 33 on which is adapted to pivot at 34 an ejecting finger 35 which is adapted to lie within the groove 31 formed within the cup 16. The finger 35 is provided with a fulcrum arm 36 provided with a depression 37 in which lies a leaf spring 38 suitably attached, as indicated at 39, in a groove 40 formed in the outer surface of the upper extractor drum 6.

In operation the ejector finger 35 is downwardly pressed against the tension of spring 38 into the position shown in full lines in Figure 5, just prior to the cutting operation. The fruit is held compressed against the ejector finger 35 during the extracting operation and at the end of the extracting operation when there is no longer any pressure on the fruit or hull the ejector finger, tensioned by the spring 38, springs into the position shown in dotted lines in Figure 5, and ejects the hull into one of the chutes 29 from whence it passes to the conveyors 30, and is removed by the movement of the conveyor belts.

In order to cut the fruit there is provided a knife 41 mounted on a base 42 which is triangular in cross section. The knife 41 is adapted to halve the fruit as it is carried forward by the rotation of the extractor drums in the direction of the arrows, as is indicated in Figure 7. The juice initially set free from the rupture of the fruit sacs through the action of the knife 41, tends to carry away essential oil which is ejected at the time the skin of the fruit is cut by the knife 41. There is a channel formed between each of the extracting drums 6 and the base 42 which holds the knife 41. This channel I have indicated by the numeral 43. The initially discharged juice and the initially discharged peel oil are conveyed away by this channel from possible entrance into the extractor chamber proper.

This feature is of considerable importance since the amount of peel oil which will be found in the extracted juice as it flows from the extracting chamber is minimized by the feature of the invention just above described.

In order to insure that atmospheric oxygen shall not contact the juice from the time the skin is broken until the juice is extracted in the inert atmosphere, in the extracting chamber 19 I have provided ingress gaskets, indicated generally by the numeral 44, and egress gaskets, indicated generally by the numeral 45.

The construction of each of these gaskets is similar. The gaskets comprise sealing layers of "Neoprene" 46 which is held in gas-tight contact with the outer cylindrical and end surfaces of the extractor drums 6, as illustrated in Figure 6. In order to hold the "Neoprene" gaskets 46 in position, I have shown a support 47 for the gaskets which is constructed of sheet metal and which holds the gaskets in gas-tight contact with the cylindrical and end surfaces of the extractor drums 6. The semi-cylindrical support member 47 forms the top of the extractor chamber 19.

Adjacent the holding pockets 16 the "Neoprene" gaskets 46 are in contact with grid members 48 which allow the male members 17 to contact the fruit held in pockets 16.

The function of the "Neoprene" gaskets, as indicated at 44 and 45, is to prevent access of oxygen to the juice. The surface of the cut fruit is adapted to traverse the knife 41 and the exterior surfaces of the triangular base piece 42 and be guided into the juncture of the drum 6 and the gasket 44. Rotation of the drum 6 carries the holding pockets around, as illustrated in Figure 7, the cut surface of the fruit after passing the surface of the triangular base 42 lying against the "Neoprene" gaskets 46 until the half of the fruit reaches the position shown in Figure 8. At such position a male member 17 is adapted to squeeze the juice sacs, as illustrated in Figure 8, and express juice into the extracting chamber 19. The grid 48 prevents the fruit and hull after extracting from falling into the extracting chamber 19. When rotation of the upper and lower extracting drums 6 and 9 causes the male members 17 which are adapted to mesh with the holding pockets 16 to move out of contact with the hulls, the hulls are carried with their cut edges bearing against the grids 48 and then against the "Neoprene" gaskets 45, until the rotation of the drums 6 carries the hulls to the position illustrated in detail in Figure 9, at which time the ejector fingers eject the hulls which fall into the ejector chutes 29.

To sum up the operation, fruit passes down the troughs 27 formed in the chute 28 and enters the row of holding pockets 16 formed in the upper extractor drums 6. The fruit is next cut, as illustrated in Figure 7, and the cut half enters the ingress seals 44. Further rotation causes the male members 17 to express juice from the fruit and the hulls are carried around into contact with the egress seals 45 which are similarly formed to the ingress seals, and which are lined with an acid resisting material such as "Neoprene." Further rotation of the drums frees the cut pieces of the hulls from contact with the "Neoprene" lining of the sealing gaskets and the hulls are discharged, as illustrated in Figure 9, from the extractor mechanism.

While I have shown one process and one apparatus, it is to be understood that I am to be limited only by the scope of the appended claims and the showing of the prior art.

I claim:

1. A juice extractor comprising a juice extracting chamber where the fruit is adapted to be extracted in an inert atmosphere, a knife for the fruit located at a point immediately prior to the point of ingress of the cut fruit into the chamber, a gasket preventing access of atmospheric oxygen to the chamber located adjacent the knife, and channels located below the knife and between the knife and the gasket to permit the flow of peel oil and juice from the cut fruit to be evacuated whereby passage into the extracting chamber is inhibited.

2. A juice extractor comprising a juice extracting chamber wherein the juice is adapted to be extracted in an atmosphere of inert gas, a knife for cutting the whole fruit located at a point immediately in advance of the point of ingress of the cut fruit into the extracting chamber, means preventing access of atmospheric oxygen into the chamber, and channels located below the cutting knife and between the knife and said means to enable the flow of peel oil and juice from the cut fruit to be evacuated whereby passage into the extracting chamber is inhibited.

3. A fruit juice extractor comprising a chamber wherein the juice is adapted to be extracted from the fruit under non-oxidizing conditions, a pair of rotary drums adjoining the chamber for feeding the fruit thereto and discharging the peels therefrom, coacting pockets in the drums for receiving the fruit, a cutting member adjacent the drums and adapted to cut the fruit in a manner so that its cut surfaces lie substantially flush with the peripheral surfaces of the drums, flexible sealing members extending from the cutting member and having their free edges adjoining the chamber, said sealing members having a surface contact with the drums and the cut surfaces of the fruit whereby access of atmospheric oxygen to the juice is inhibited, means to collect and remove the juices and peel oil released in cutting whereby admission of peel oil into the extraction chamber is prevented.

4. A fruit juice extractor comprising a chamber wherein the juice is adapted to be extracted from the fruit under non-oxidizing conditions, a pair of rotary drums adjoining the chamber for feeding the fruit thereto and discharging the peels therefrom, coacting pockets in the drums for receiving the fruit, a cutting member adjacent the drums and adapted to cut the fruit in a manner so that its cut surfaces lie substantially flush with the peripheral surfaces of the drums, flexible sealing members extending from the cutting member and having their free edges adjoining the chamber, said sealing members having a surface contact with the drums and the cut surfaces of the fruit whereby access of atmospheric oxygen to the juice is inhibited, an aperture in each sealing member to permit extraction of the juice, means to collect and remove the juices and peel oil released in cutting whereby admission of peel oil into the extraction chamber is prevented.

5. A fruit juice extractor comprising a chamber wherein the juice is adapted to be extracted from the fruit, a knife positioned exteriorly of the chamber, a conveyor adapted to move whole fruit over the knife to cut the fruit and then move the cut fruit to the extraction chamber, and means to collect and remove the juice and peel oil released in cutting whereby admission of peel oil into said extracting chamber is prevented.

6. A fruit juice extractor comprising a chamber wherein the juice is adapted to be extracted from the fruit, a knife positioned exteriorly of the chamber, a conveyor adapted to move whole fruit over the knife to cut the fruit and then move the cut fruit to the extraction chamber, and channel means adjacent the knife to collect and remove the juice and peel oil released in cutting whereby admission of peel oil into said chamber is prevented.

RONALD B. McKINNIS.